United States Patent
Bazinet et al.

(10) Patent No.: US 8,227,003 B2
(45) Date of Patent: Jul. 24, 2012

(54) METHOD FOR EXTRACTING LIPIDS FROM BIOLOGICAL SOLUTIONS

(75) Inventors: Laurent Bazinet, L'Ancienne-Lorette (CA); Fabrice Lin Teng Shee, Québec (CA); Paul Angers, Québec (CA); Wassef Ben Ounis, Québec (CA)

(73) Assignee: Universite Laval, Québec, QC (CA)

( * ) Notice: Subject to any disclaimer, the term of this patent is extended or adjusted under 35 U.S.C. 154(b) by 513 days.

(21) Appl. No.: 11/578,305

(22) PCT Filed: Apr. 15, 2005

(86) PCT No.: PCT/CA2005/000577
§ 371 (c)(1),
(2), (4) Date: Oct. 31, 2007

(87) PCT Pub. No.: WO2005/099876
PCT Pub. Date: Oct. 27, 2005

(65) Prior Publication Data
US 2008/0171118 A1 Jul. 17, 2008

Related U.S. Application Data
(60) Provisional application No. 60/562,550, filed on Apr. 16, 2004.

(51) Int. Cl.
*A23C 15/14* (2006.01)
(52) U.S. Cl. ....................................................... 426/417
(58) Field of Classification Search ................... 426/417
See application file for complete search history.

(56) References Cited

U.S. PATENT DOCUMENTS

| | | | | |
|---|---|---|---|---|
| 3,922,375 A | * | 11/1975 | Dalan et al. | 426/583 |
| 5,223,107 A | * | 6/1993 | Batchelder | 426/239 |
| 7,582,326 B2 | * | 9/2009 | Brown et al. | 426/657 |

FOREIGN PATENT DOCUMENTS

| | | |
|---|---|---|
| CA | 2275758 | 7/1998 |
| CA | 2414012 | 12/2001 |
| EP | 0 504 904 | 3/1992 |
| FR | 2331964 | 11/1976 |
| FR | 2657233 | 7/1991 |
| FR | 2671945 | 7/1992 |
| NL | 7513645 | 5/1977 |
| WO | 9222368 | 5/1992 |
| WO | 0108502 | 7/2000 |

OTHER PUBLICATIONS

Bazinet, Laurent. "Effect of KCl of Soy Protein Concentrations on the Performance of Bipolat Membrane Electroacidification" J. Agric. Food Chem. 1997, 45, 2419-2425.*

Bazinet L et al., 1999, "Bipolar membrane electroacidification to produce bovine milk casein isolate.", J. Agric. Food Chem., 47: 5291-5296.

(Continued)

*Primary Examiner* — D. Lawrence Tarazano
*Assistant Examiner* — Katherine DeGuire
(74) *Attorney, Agent, or Firm* — Norton Rose Canada LLP

(57) ABSTRACT

Bipolar membrane electrodialysis (BMED) was used to separate lipids from biological solutions. The lipids are separated from animal as well as vegetable solutions. Particularly, bipolar membrane precipitates high levels of lipids from a biological solution. The BMED single step process improves significantly lipid precipitation rates in several biological solutions of different natures.

3 Claims, 11 Drawing Sheets

OTHER PUBLICATIONS

Shee F.L.T. et al., "Precipitation of cheddar cheese whey lipids by electrochemical acidification.", Department of Food Sciences and Nutrition, Université Laval, Québec City, Québec, Canada.

Theodet C. and Gandemer G., 1994, "Devenir des lipides au cours de la clarification du lactosérum.", Lait, 74: 281-295 (Abstract).

Bazinet L., 2005, "Electrodialytic Phenomena and Their Applications in the Dairy Industry: A Review", Critical Reviews in Food Science and Nutrition, 45: 307-326.

Pourcelly G. & Bazinet L., 2008, "Developments of Bipolar Membrane Technology in Food and Bio-Industries", Handbook of Membrane Separation, pp. 581-634.

Bazinet, L. et al., "Bipolar Membrane Electroacidification of Demineralized Skim Milk." J. Agric. Food Chem. 49:2812-2818, 2001.

Bazinet, L. et al., "Cationic balance in skim milk during bipolar membrane electroacidification." Journal of Membrane Science 173:201-209, 2000.

* cited by examiner

METHOD FOR EXTRACTING LIPIDS FROM BIOLOGICAL SOLUTIONS

CROSS REFERENCE TO RELATED APPLICATIONS

This application is a 371 National Stage of International Application No. PCT/CA2005/000577 filed Apr. 15, 2005, which designated the U.S., and which claims benefit under 35 U.S.C. 119(e) of U.S. Provisional Application Ser. No. 60/562,550 filed Apr. 16, 2004.

BACKGROUND OF THE INVENTION

1. Field of the Invention

The present invention relates to a method for separating lipids from solutions of animal or vegetable sources.

2. Description of Prior Art

Separation and isolation constitute a unit in most separation methods in biology, nutrition, and medicine. Biological material is treated for the purpose of subsequent enrichment, separation or isolation of individual substances or groups of substances or compartments.

The isolation of substances from the most diverse biological materials, liquids, and solutions has been a long-standing practice. Both unambiguous characterization and use in various fields such as nutrition, pharmacy or medicine, for example, in most cases require the chemically uniform compound, i.e. the pure substance, or composition deleted from certain substances. Within the entire life science sector, therefore, separation methods represent one of the most important foundations for the identification of substances and their use. Said isolation or separation often constitutes a problem, depending on the specific isolation task, for example regarding the purity of the substance to be isolated.

The isolation or separation of biological material, for example organisms, tissues, biological cells, organelles, micelles, viruses etc., as a rule generally constitutes the first step in the analysis or extraction of cell constituents. Such constituents can, for example, be nucleic acids, proteins, metabolites, pigments, lipids etc. As the quality of all subsequent steps is determined by the treatment, such as disintegration, of the biological material, this process occupies a key position. Novel methods are therefore of interest for a multiplicity of procedures and have a proportionately large potential for being marketed profitably as a product. Denaturation seems a prerequisite, in the same way as explained above for the separation methods, for life science fields or nutrition. Methods of denaturating biological material are not universal, but are geared very specifically to the particular requirements. The known methods—mechanical and non-mechanical denaturation methods—are toxic, expensive, time-consuming and laborious, as well as being limited to specific applications. Moreover, there is a high risk of cross-contamination which has a major impact on the quality of all subsequent process steps, especially in sensitive separation methods. With the known mechanical methods, moreover, standardization and automation is more difficult, or it is virtually impossible to combine them with separation and isolation methods.

The standard separation and isolation methods generally include filtration, centrifuging, crystallization, distillation, extraction, electrophoresis, chromatography and magnetism-based methods.

A precipitate with different levels of lipids and β-lactoglobulin (lipids/proteins ratio of 0.60) can be then obtained. In order to improve whey protein fractionation techniques, other processes to remove residual fats were proposed, but the yield are still without significant satisfaction.

Considering the state of the art mentioned above, there is still needs of method for new innovation for separation of lipids from biological solutions or liquid compositions.

SUMMARY OF INVENTION

A method for separating lipids from a biological solution comprises subjecting said biological solution to treatment with at least one bipolar membrane. The biological solution can be from animal or vegetable sources. It may consist more precisely in milk whey, vegetable whey, vegetable juice, fruit juice, or wine, or again any dairy derived by-product selected from the group of cheese, yogurt, cream, milk, whey or a whey protein concentrate.

Another object of the present invention is to provide a method wherein demineralization occurs simultaneously than lipid separation. In accordance with another object, the yield of the lipid separation is of up to 95%, and demineralization can be in proportion of between 40 to 99% (w/w). It will be recognized to someone skilled in the art that delipidation and demineralisztion yields can be lower depending of the needs and the time and number of treatments applied to a solution sample or to a batch solution. The solution flow can be adjusted to allow rshort or long lasting treatment of the biological solution by a bipolar membrane, or it can be alternatively or complementary treated several times on this way.

It is an object of the present invention to provide a process including a bipolar membrane electrodialysis step to acidify, such as cheddar cheese whey, to precipitate lipids there from.

It is another object of the present invention to provide a preliminary demineralization step using conventional electrodialysis, before the above-mentioned bipolar membrane electrodialysis step.

It is another object of the present invention to carry out the above-mentioned bipolar membrane electrodialysis step, thereby partially precipitating fats initially present in said whey (about 30%).

It is another object of the present invention to improve fat precipitation by treating a whey concentrate containing about 55% proteins for promoting proteins-lipids interactions that are responsible for the formation of precipitable proteins-lipids complexes.

It is another object of the present invention to verify the effect of a decrease in ionic strength of a whey protein concentrate by demineralization using electrodialysis with homopolar membranes, or by dilution with water.

It is another object of the present invention to evaluate a process involving bipolar membrane electrodialysis (BMED) for the purpose of acidifying cheddar cheese whey and to precipitate lipids.

It is another object of the present invention to provide a process involving whey electroacidification which is carried out with or without preliminary demineralization by conventional electrodialysis.

It is yet another object of the present invention to measure lipids and proteins precipitation rates after a centrifugation step following the electroacidification of whey.

Another object of the present invention is directed to a method for sequentially extracting lipids from a dairy by-product which comprises the steps of:

submitting the dairy by-product to BMED in order to obtain a first lipid fraction and a first protein-enriched fraction;

separately retrieving both the first lipid fraction and the first protein-enriched fraction;

adding deionized water to the first protein-enriched fraction in order to obtain a second lipid fraction and a second protein-enriched fraction;

separately retrieving both the second lipid fraction and the second protein-enriched fraction; and combining first lipid fraction and second lipid fraction.

Another object of the present invention is to provide a method for precipitating lipids from a solution containing same, which comprises subjecting said solution to bipolar membrane technology, or bipolar membrane electrodialysis (BMED).

In one embodiment of the present invention, the method further comprises the step of centrifuging the dairy by-product, the first protein-enriched fraction or the second protein-enriched fraction to obtain a third lipid fraction and a third protein-enriched fraction, and the step of separately retrieving both the third lipid fraction and the third protein-enriched fraction. Therefore, a total of three lipid fractions and three protein-enriched fractions would be obtained.

The BMED is preferably performed using at least one bipolar membrane. Additional steps for further separating the lipid fractions may be performed, either by decantation, centrifugation or filtration Prior to treatment by BMED, the biological solution can be demineralized, for example by conventional electrodialysis.

The present invention also relates to a method for precipitating lipids from a solution containing same, which comprises subjecting the solution to BMED, for example by using at least one bipolar membrane.

The solution to be treated by the present method can be a dairy by-product or dairy derived product, such as whey or whey protein concentrate, for example cheese whey, most preferably cheddar cheese whey.

The expression "biological solution" as used herein is intended to mean any biological fluid, solution or relatively liquid composition of any animal or vegetable origin or source. The density, viscosity or even consistency of the biological solution may vary depending of its origin or the processing, if so, of the source prior performing the process of the present invention.

The expression "bipolar membrane electrodialysis" (BEMD) as used herein is intended to be comprised of, but not restrict to, electroacidification as well as electroalkalinisation.

DETAILED DESCRIPTION OF THE INVENTION

Figure 1:
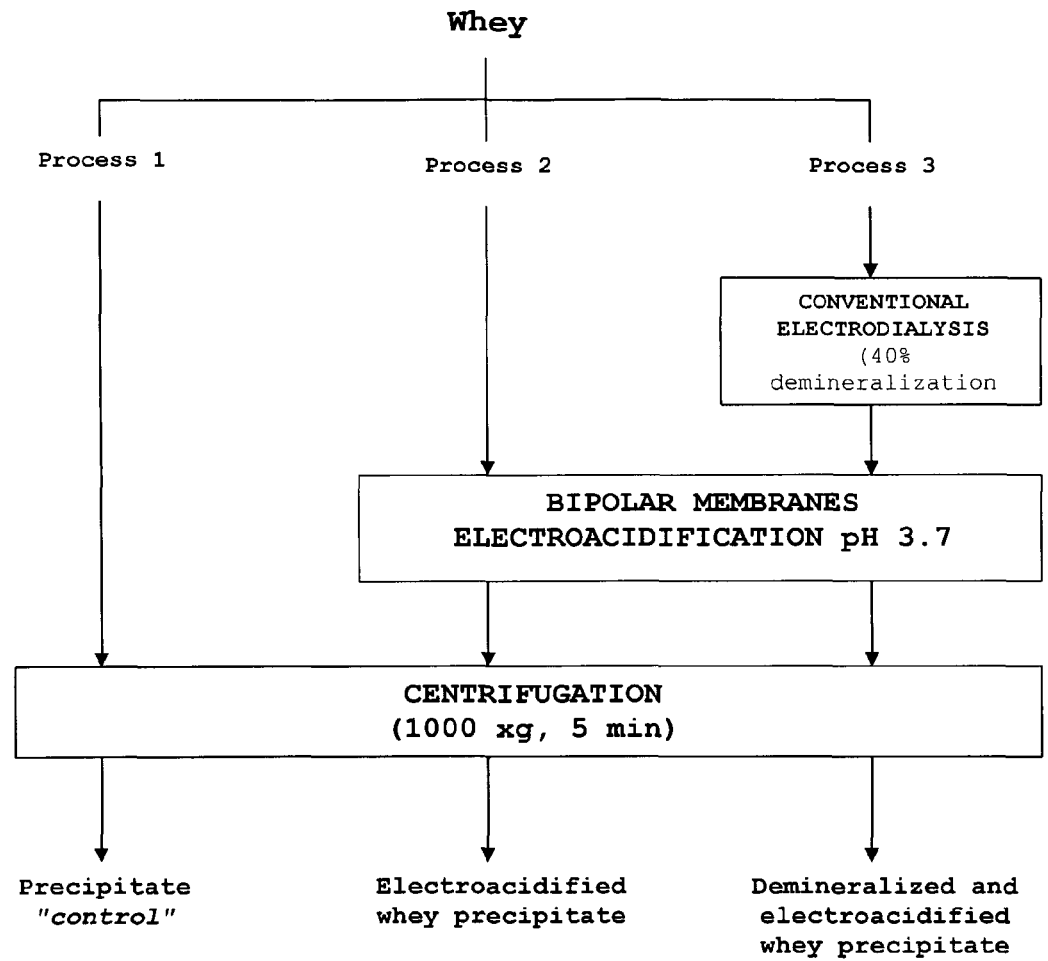
FIG. 1 is a schematic representation of cheddar cheese whey treatment in accordance with one embodiment of the present method and involving electrodialysis and/or bipolar membranes electroacidification.

The present invention now will be described more fully hereinafter with reference to the accompanying drawings, in which preferred embodiments of the invention are shown. This invention, may, however, be embodied in many different forms and should not be construed as limited to the embodiments set forth herein; rather, these embodiments are provided so that this disclosure will be thorough and complete, and will fully convey the scope of the invention to those skilled in the art.

One embodiment of the present invention is to provide a method for isolating or separating lipids or lipid fraction from biological solutions. Preferably, the method is applied on liquid solution, such as, but not limited to, milk derived products, or vegetable whey.

In a preferred embodiment, the method includes treatment of a biological solution with a bipolar membrane. The biological solution can pass, depending on needs or on the nature of the biological solution, on each side of the bipolar membrane.

Bipolar membrane electrodialysis (BMED) is a novel technology from the combination of electrodialysis and specific properties of bipolar membranes to split water at the interface of bipolar membrane. BMED can act in two ways: electroacidification and electro-alkalinization. For a solution circulated into an electrodialysis cell on the cationic side of the bipolar membrane, where the $H^+$ are generated, the pH of the solution will decrease. Similarly, a solution circulated on the anionic side of the bipolar membrane, where $OH^-$ are generated, will experience an increase in pH. This process can be used as well in the medical as in the food industry for the production of defatted biological liquids, solutions or compositions.

Bipolar membrane electrodialysis (BMED) has found numerous advantages in the context of the present invention. BMED uses electricity to generate the desired ionic species to acidify or alkalinize the treated solutions. The process can be precisely controlled, as electroacidification or electroalkalinization rate is regulated by the effective current density in the cell. Water dissociation at the bipolar membrane interface is continuing and avoids local excess of acid. The in-situ generation and reuse of dangerous chemicals for the environment (acids and bases) suppress the drawbacks and the risks linked to the handling, transportation, use and elimination of these products.

According to another embodiment of the present invention, for example but not limited to, in a bipolar membrane(BPM)/Cation exchange Membrane (CEM) electroacidification configuration or in bipolar membrane(BPM)/Anion exchange Membrane (AEM) electroalkalinization configuration, BMED allows a coupled effect of demineralization and acidification/alkalinization by using the properties of bipolar membranes to dissociate water molecules at their interfaces and of ion-exchange membranes (IEM) to demineralise by migration of low molecular weight ionic species. These ionic species can be for example, but not limited to, inorganic salts such as $Na^+$, $Cl^-$, $Mg^{2+}$, $Ca^{2+}$ from milk, dairy by-products. Demineralization can be performed on tofu, sugar solutions, fruit or vegetable juices, and wine. This can result of up to 90-95% demineralization. Moreover, by the use of an electrodialytic system, system well-known in industry, BMED can easily be used in a small treatment system or at the industrial scale.

For people skilled in the art, it will be admitted that whatever the application of, alkalinization or acidification through BMED, cation or anion-exchange membrane indifferently can be used in the configuration according to the final product, demineralization rate or energy consumption to be reached. Furthermore, in the BMED configuration the bipolar membrane could be separated by more than one anion or cation-exchange membrane to create a new compartment for a product of interest or in order to decrease the possibility of fouling of the membrane. Furthermore, for example and not limited to, in the BPM/CEM configuration, the compartment where the base is generated could be neutralized by addition of acid or other compounds to limit or avoid the potential fouling of the ion-exchange membrane.

The conditions for separating or isolating lipids by the use of a bipolar membrane can vary depending on the results sought or the nature of the biological solution to be treated. For example, the pH of the biological solution can be reduced or increased, with a current that is preferably constant during the treatment, but can also be resettled at different moment of the treatment. The voltage drop per elementary cell has generally to be maintained in the range of about, but not limited to, 0.5 to 25 V for 10 to 10 000 $A/m^2$, but preferably 1.5-3 V for 1000 $A/m^2$. The applied current density is generally speaking in the range of about, but not limited to 10 to 500 $mA/cm^2$, but preferably about 50-100 $mA/cm^2$.

Among biological solutions that can be delipidated, or defatted by the method of the present invention, can be found dairy derived products, such as, but not limited to, whey solution or concentrate, creams, etc. The whey products are preferably milk derived solutions of products that can be selected from the group consisting of sweet dairy whey, neutralized acid whey, modified whey, whey protein concentrate, and mixtures thereof. The milk products are preferably selected from the group consisting of whole milk and cultured milk of any kind such as skim or whole, as well as buttermilk, acidophellic milk, yogurt, and cheese of any kind.

It is another embodiment of the present invention that the process for delipidation, or lipid separation or isolation, can be performed on biological solution prepared by dissolution in aqueous medium or salt aqueous medium, of dry formulations or composition of animal or vegetable extracts. For example, a vegetable extract may consist in a rough homogenized composition of plant materials, to which diluents, such as water or ionic solutions, can be added prior to performing the process of the invention.

In another embodiment, the method of the present invention can be performed to isolated or separate lipids of several natures. For example, it is known that whey lipids are composed of almost 66% of non-polar lipids and 33% of polar lipids. Polar lipids are mainly phospholipids with about 34% phosphatidylethanolamine, 31% phosphatidylcholine, 15% sphingomyelins, 12% phosphatidylinositol and 8% phosphatidylserine. Therefore, the method using bipolar membrane as described herein can be applied for separating different types of lipids from a biological solution. The method of the present invention can therefore also allow the separation of lipids of different natures, such as polar or non-polar lipids, or lipids associated with different salts, such as sodium, phosphate, calcium, or any other salt found in any biological solutions. Preparative methods can be employed for concentrating, separating or extracting larger quantities of as pure or relatively pure a substance as possible. Lipid separation, for example, from cheddar cheese whey allows a better valorization of the protein fractions. Dairy whey is a by-product of cheese and casein manufacture. Cheese whey contains almost 7 g/L of proteins with a high content in β-lactoglobulin. Whey solutions can be treated by ultrafiltration, and then the concentrate was chemically acidified at pH 4.65 and demineralized by electrodialysis Other biological solutions that can be treated according to the purpose of the present invention for delipidation or deffatation, are of vegetable sources, such as, but not limited to, vegetable whey, vegetable milk, as for example soy milk or soy whey, It will be understood by the man skilled in the art that the lipid separation, delipidation or defattation yield obtained is allowed at a rate of up to 95%, with concomitant, where useful or necessary, demineralization of up to 99%.

The present invention will be more readily understood by referring to the following examples which are given to illustrate the invention rather than to limit its scope.

EXAMPLE I

Delipidation of Cheddar Cheese Whey

Materials and Methods

Fresh cheddar cheese whey was provided by Fromagerie SMA (Quebec, Canada). The composition of the whey was the following in grams (g) per 100 g of cheese whey: dry matter, 7.2±0.2; lactose, 6.0±0.6; total protein, 0.7±0.2; fat, 0.3±0.02; ashes, 6.0±0.6. Whey initial pH was of 6.3.

An electrodialysis cell and a bipolar membrane electrodialysis cell were used to extract the lipids from cheddar cheese whey The electrodialysis cell was a MP-type electrodialysis cell (100 $cm^2$ of effective surface area) manufactured by the ElectroCell Systems AB Company (Täby, Sweden), which was used with four Neosepta CMX-SB cationic membranes (Tokuyama Soda, Japan) and two Neosepta AMX-S anionic membranes (Tokuyama Soda, Japan). This arrangement sets up three circuits containing the cheddar cheese whey solution (2.5 L), a 2 g/L aqueous KCl solution (6 L) as the concentrate, and a 20 g/L NaCl solution (6 L) as the electrolyte. The flow rate for both the whey and the KCl solution was of 2 L/min, while it was of 3 L/min for the electrolyte solution. Each circuit formed a closed loop that was connected to a separate external container in such a way that it allowed for continuous recirculation. The anode was a dimensionally stable electrode (DSA) while the cathode was a 316 stainless steel electrode, and both were supplied with the MP cell.

The MP-type electrodialysis cell was also used for the bipolar membrane electroacidification of the whey solution. This system consisted of three closed loops separated by four Neosepta CMX-SB cationic membranes (Tokuyama Soda, Japan) and two Neosepta BP-1 bipolar membranes (Tokuyama Soda, Japan) containing the same solutions as previously mentioned.

The protocol used for the treatment of whey is presented in FIG. 1. The whey solution was only centrifuged in Process 1 while in Process 2, it was electroacidified using bipolar membranes prior to centrifugation. Process 3 on the other hand, consisted of a conventional electrodialysis step until the whey solution reached a 40% demineralization rate prior to bipolar membrane electroacidification and centrifugation. The precipitates obtained during the different processes were freeze-dried for 48 h (Freezone Model 4.5; Labconco Corporation, Kansas city, Mo., USA) before being weighed and stored ready for use. Total protein, fat, lactose, ash and dry matter measurements were performed on dry samples. Each process or combination of processes was repeated three times and the results are given as averages of these data.

Centrifugation

Centrifugation was carried out by centrifuging one liter of whey for 5 min at 1000×g (Biofuge Centrifuge Model 22R, Heraeus Instruments, Germany).

Conventional Electrodialysis

Conventional electrodialysis was carried out in batch using a constant voltage of 10 V. Electrodialysis was stopped after a 40% demineralization rate was reached.

Bipolar Membrane Electroacidification (BMEA)

BMEA was carried out in batch using a constant current of 2.0 A. Electroacidification was stopped after reaching pH 3.7.

Electrolytic Parameters

Duration, pH and electrical conductivity of cheddar cheese whey voltage and current intensity applied at the electrodes of the cell were recorded throughout the electrodialysis and electroacidification treatments. The global resistance ($\Omega$) of the system was calculated, using Ohm's law, from the ratio between voltage (V) and current intensity (A), read directly from the indicators provided on the power supply. The pH of the whey solution was measured with a pH-meter VWR (Model SP 20, VWR International, Plainfield, N.J., USA). The conductivity was measured with a VWR conductivity meter model SP 40 with a cell constant=1/cm (VWR International).

Total Protein Content

The total protein content of the freeze-dried precipitates obtained by the three processes was determined by a FP-528 Leco apparatus (Leco corp., Michigan, USA) using the Dumas combustion method (ISO 34/SC5 norm). The instrument was calibrated with ethylenediaminetetraacetic acid (EDTA) as a nitrogen standard. The protein level was calculated from nitrogen data using a coefficient of 6.38. Analysis parameters were set in accordance with the manufacturer's recommendations:

| Analysis constants: | Oxidation furnace temperature | 953° C. |
|---|---|---|
| | Reduction heater | 733° C. |
| | Flow control temperature | 40° C. |
| | Cold junction | 25° C. |
| | Cooler temperature | 5° C. |
| Flow constants: | High, 20 sec., High, 20 sec, High, end | |

Lipid Content

The lipid content of the freeze-dried precipitates obtained by the three processes was determined using a modified Mojonnier method (AOAC International Method, In official methods of analysis, 15$^{th}$ ed. Association of official Analytical Chemists, Washington, D.C., 1990). Two extractions were carried out on 4 g of samples using 0.3 mL of $NH_4OH$, 2 mL of ethanol, 5 mL of diethyl ether, and 5 mL of petroleum ether. The samples were agitated for 1 min after each solvent addition.

Lactose Content

The lactose content was determined by a spectrophotometric method using sulfuric phenol (Dubois et al., 1956). The sample solution (1 mL) was mixed with 1 mL of 5% phenol and with 5 mL of concentrated $H_2SO_4$. The concentration of lactose into the sample was determined by comparison with a standard curve made from lactose solutions at known concentrations. The absorbancy of solutions was read at 490 nm.

Dry Matter and Ash Content

The dry matter content was determined by drying samples overnight in a 95° C. oven. The samples were then ashed at 550° C. for 20 hours (AOAC Method, 1990 b).

Results

Electrodialysis Parameters: Duration, Resistance and Conductivity

Duration

Figure 2:
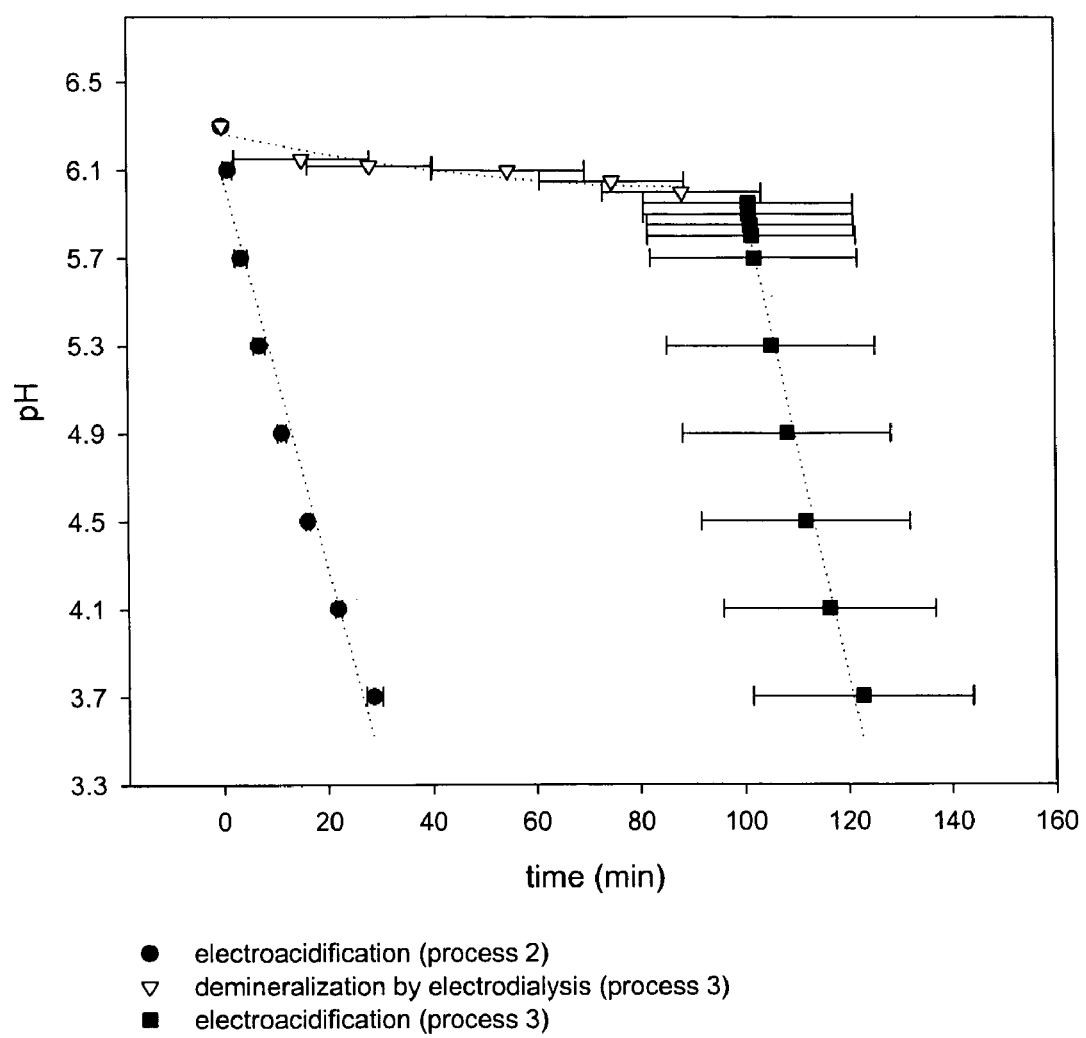
FIG. 2 illustrates the evolution of pH in relation with time during whey electroacidification with and without preliminary demineralization by conventional electrodialysis.

The whey electroacidification process in Process 2 was carried out until its pH decreases from 6.3 to 3.7 (FIG. 2). The mean time required to electroacidify the whey solution was 29±2 min. It was also obtained a duration of almost 18 min during skim milk (1.1 L) electroacidification from pH 6.6 to pH 4.0 using three bipolar membranes with a constant current density of 20 mA/cm$^2$. The volume of solutions treated per membrane surface area was of 37 L/m$^2$ of bipolar membrane for skim milk while it is of 125 L/m$^2$ for the whey solution in the present method. The biggest volume per membrane surface area used in the electroacidication of whey compared to that of skim milk may explain the longest duration required for whey electroacidification.

The duration of the global process as shown in Process 3 (BMEA plus electrodialysis) was 123±22 min. A small decrease in whey pH from 6.3 to 6.0 appeared during the demineralization step which lasted 88±15 min. The electroacidification following the demineralization lasted 35±22 min. The electroacidification was carried out in a similar way during the Process 2 and Process 3 because the slope of the acidification curves in the electroacidification phase are almost the same with correlation coefficients ($R^2$) of −0.09 and −0.10 respectively for Processes 2 and 3.

Global Resistance of the Cells

Figure 3:
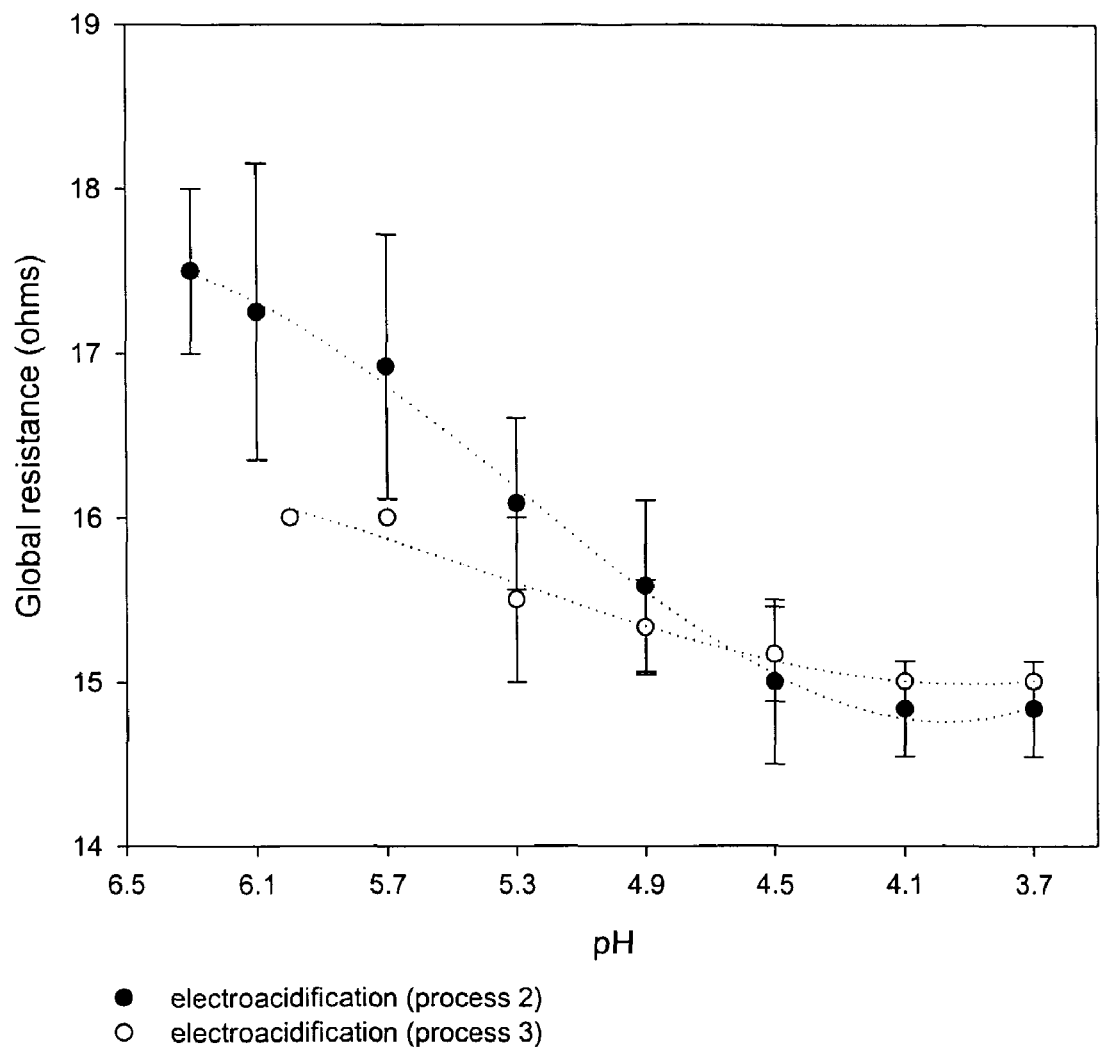
FIG. 3 illustrates the evolution of the global resistance of the system in relation with pH changes during whey electroacidification.

The global resistance of the conventional electrodialysis system was constant during the process with a value of 18±2$\Omega$. In the BMEA processes (FIG. 3), at pH values between 6.0 and 3.7, resistances dropped from 17.5±0.5$\Omega$ to 14.8±0.3$\Omega$ for Process 2 and from 16.0 to 15.0$\Omega$ for Process 3. These resistance drops were caused by H$^+$ ions produced by the bipolar membrane. Effectively, when H$^+$ ions are generated at the bipolar membrane, whey cationic charges cross the cation exchange membrane to keep the solution electrically neutral. Intrinsic cationic charges of whey are replaced by H$^+$ ions which have a high electrical mobility. Due to their higher mobility, the H$^+$ ions improved the flow of the electrical current and thus decreased the global resistance of the system. The drop in global resistance was also partially caused by the increased in ionic concentration in the adjacent compartment.

Conductivity

Figure 4:
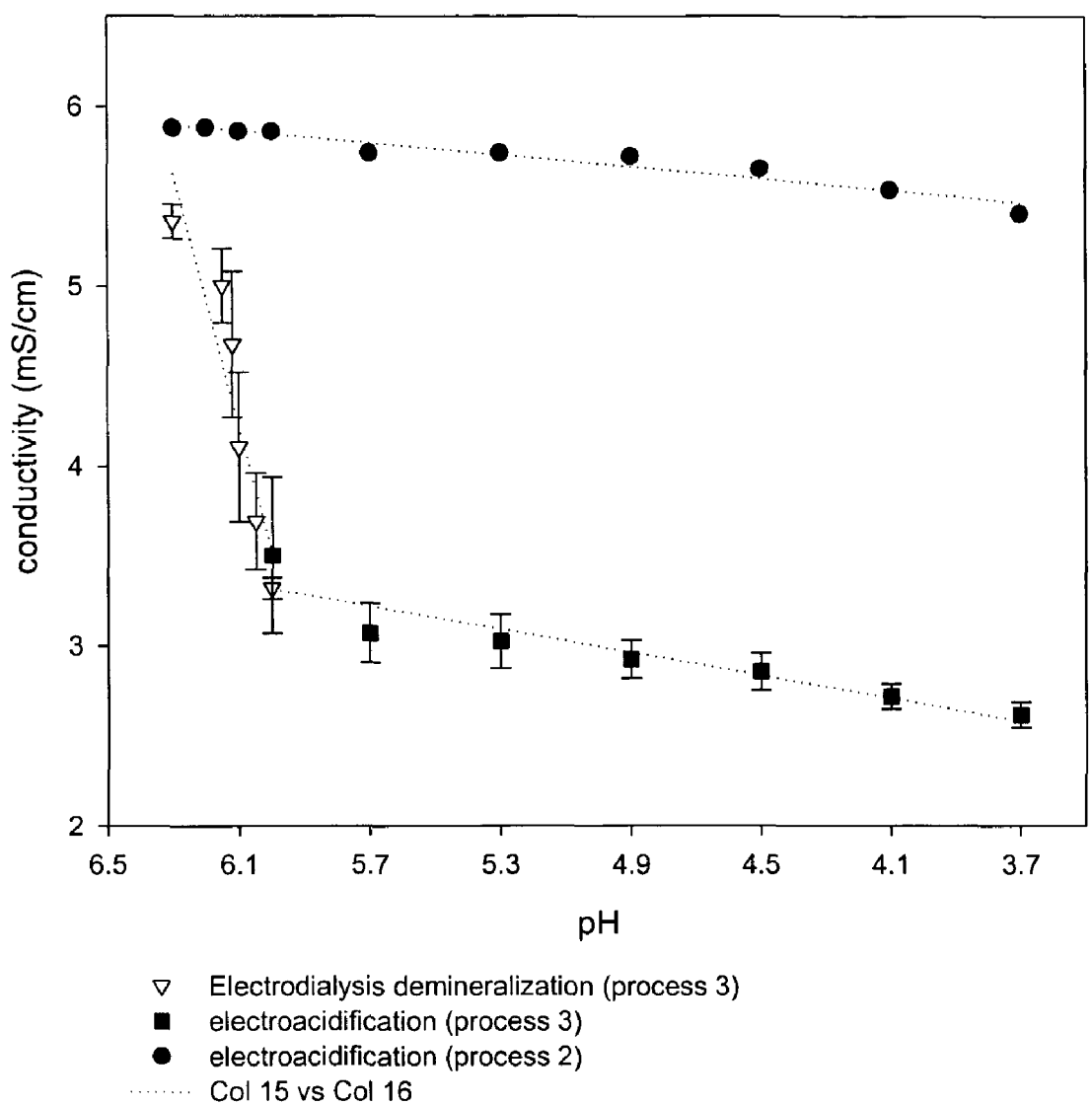
FIG. 4 shows the evolution of the conductivity in relation with pH changes during whey electrodialysis and/or electroacidification.

Whey solution conductivity data during the electrodialysis and the electroacidification processes are presented in FIG. 4. During the conventional electrodialysis process, conductivity dropped from 5.36±0.1 mS/cm to 3.32±0.06 mS/cm, which corresponds to a 40% whey solution demineralization. Partial demineralization of whey solution occurred during electroacidification processes which involved a 16% decrease in conductivity (0.5 to 0.9 mS/cm decrease). The drop in conductivity during whey electroacidification is more important than the decrease in conductivity observed in skim milk because of the lower buffering capacity of the whey solutions in comparison to skim milk. This difference may be influenced by the buffering capacity of proteins since high protein content slows down the electroacidification process. With higher protein content, more H$^+$ ions have to be generated by the bipolar membranes to decrease the pH by one unit. Therefore, the electroacidification process takes more time for solutions having a highest content of proteins. Furthermore, as previously mentioned, H+ ions, which replaced the main cationic species in the solution treated, have a higher conductivity contribution in comparison with all others cations.

Precipitate Composition.

Centrifuigation of whey solution at 1000×g during 5 min (Process 1) allowed for 20.8% recovery of the total lipids initially present in cheddar cheese whey (Table 1). Other constituents such as proteins and lactose precipitated only to a very small extent (1.1% and 0.6% respectively). A 32.1% whey lipid precipitation was obtained by Process 2, which involved an electroacidification step at pH 3.7 prior to the centrifugation step. This represents a 54% increase of the precipitation rate in comparison with Process 1. Proteins and lactose precipitation levels were quite similar to those in Process 1 (1.9% and 0.9% respectively). Process 3 produced precipitation levels similar to those obtained with Process 2 except for proteins. The addition of a conventional electrodialysis step allowed for an increase of protein precipitation in the range of 1.9% to 3.3% (Table 1).

TABLE 1

Whey components precipitation rates (g per 100 g of fresh cheddar cheese whey).

|  | Process 1 | Process 2 | Process 3 |
| --- | --- | --- | --- |
| Lipids | 20.8 ± 3.5 | 32.1 ± 4.7 | 29.7 ± 2.3 |
| Proteins | 1.1 ± 0.7 | 1.9 ± 0.5 | 3.3 ± 0.4 |
| Lactose | 0.6 ± 0.4 | 0.9 ± 0.2 | 1.1 ± 0.1 |
| Total solids | 1.5 ± 0.6 | 2.3 ± 0.4 | 2.6 ± 0.2 |

The recovery of lipids by centrifugation in Process 1 was due to residual fat particles. The additional lipid precipitation observed in Process 2 and Process 3 may be explained by the formation of lipid-protein complexes during electroacidification which then precipitate. The formation of those complexes may be characterized by the protein/lipid ratio: a high ratio level representing a high number of proteins that can bind with lipids. The protein-lipid association was enhanced by Process 3 conditions (protein/lipid ratio of 0.26) in comparison with Processes 1 and 2 (ratio of 0.13) (Table 2).

TABLE 2

Composition of cheddar cheese whey and precipitates from the three processes

|  | Whey | Process 1 precipitate | Process 2 precipitate | Process 3 precipitate |
| --- | --- | --- | --- | --- |
| Lipids | 4.2% | 57.7% | 58.2% | 48.4% |
| Proteins | 9.7% | 7.3% | 7.8% | 12.5% |
| Lactose | 83.3% | 30.3% | 32.1% | 35.9% |
| Ashes | 6.9% | 3.7% | 2.4% | 1.6% |
| Proteins/lipids | 2.31 | 0.13 | 0.13 | 0.26 |
| Ash/lipids | 1.64 | 0.06 | 0.04 | 0.03 |

The protein-lipid interactions that exist in food systems involve hydrophobic interactions between the apolar aliphatic chains of the lipids and the apolar regions of the proteins. In model systems, the energy of a protein-lipid interaction reaches its maximum at a pH value approaching the isoelectric point of the protein. β-lactoglobulin, the main whey protein, have an isoelectric point at a pH value of 5.5, so, at pH 3.7, the protein carries a positive electric charge. Some phospholipids are negatively charged at an acidic pH, such as phosphatidylserine which has two negatively charged groups at pH 3.7, the phosphoric acid group and the carboxylic acid group.

It is of note that the association between lipids and proteins are probably electrostatic interactions involving the phospholipids. Calcium ions are linked to phospholipids. The binding of calcium to lipids is therefore inhibiting the formation of lipid-protein complexes. Consequently, the following equation was calculated for evaluating the mechanism of protein-lipid complex formation with respect to the calcium ions level:

$$P^{Z+} + nCaL^+ \leftrightarrows PL_n^{(Z-n)+} + nCa^{2+} \qquad (1)$$

where P: protein with a charge Z, n: number of phospholipids bound per protein group, Ca: calcium, and L: phospholipids carrying a negative charge.

A calculation of the ash/lipid ratio obtained from our method allowed for the evaluation of the interaction level between the calcium ions and the lipids. Those were respectively of 0.06, 0.04 and 0.03 for Processes 1, 2 and 3 (Table 2). This decrease in mineral salts, particularly in calcium ions, observed in Processes 2 and 3 is promoting the formation of lipid-protein complexes as it is confirmed by higher precipitation levels for both lipids and proteins in process 3 in comparison with process 1 (Table 1). The formula of Cornell et al. predicts that an increase in $P^{Z+}$ components should stimulates the formation of lipid-protein complexes. A greater increase in $P^{Z+}$ components may be achieved by further concentrating the whey solution by ultrafiltration.

The BMEA step prior to the centrifugation step at 1000×g during 5 min allowed a total 32.1% lipids precipitation level from an initial fresh cheddar cheese whey solution. Thus, the electroacidification step increased the lipid precipitation level by almost 54% in comparison with a treatment of whey by centrifugation alone. When demineralization was performed before the BMEA step, an increase in the proteins precipitation level was observed, but without any additional increase in lipids precipitation could be noted.

An acidic pH enhances electrostatic interactions between negatively charged compounds for lipids and positively charged compounds for the proteins while a decrease in minerals level allows for the liberation of ionized zones, particularly those of phospholipids, thus enhancing the formation of lipoproteins complexes. Hence, the lipids and proteins precipitation following the electroacidification step is probably induced by the formation of lipid-protein complexes caused by the combined effects of acidification and the decrease in the ionic strength of the solution.

EXAMPLE II

Delipidation of a Whey Protein Concentrate (WPC) by Electroacidification

Figure 5:
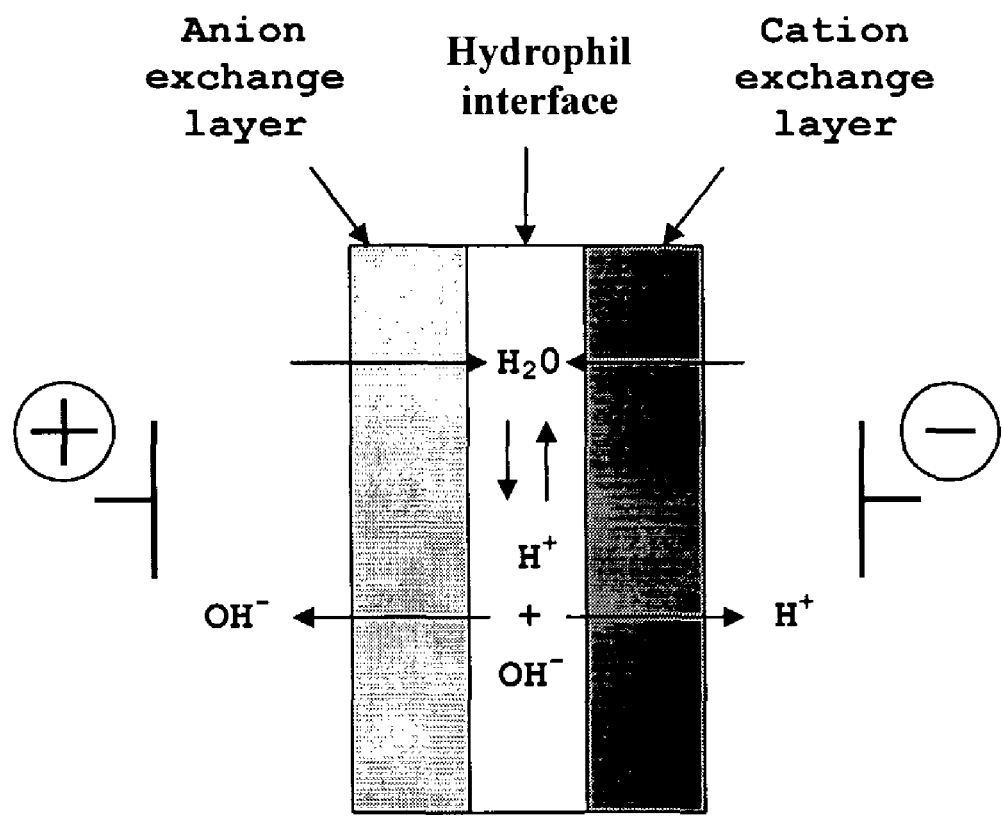
FIG. 5 the operating principle of a bipolar membrane.
Figure 6:
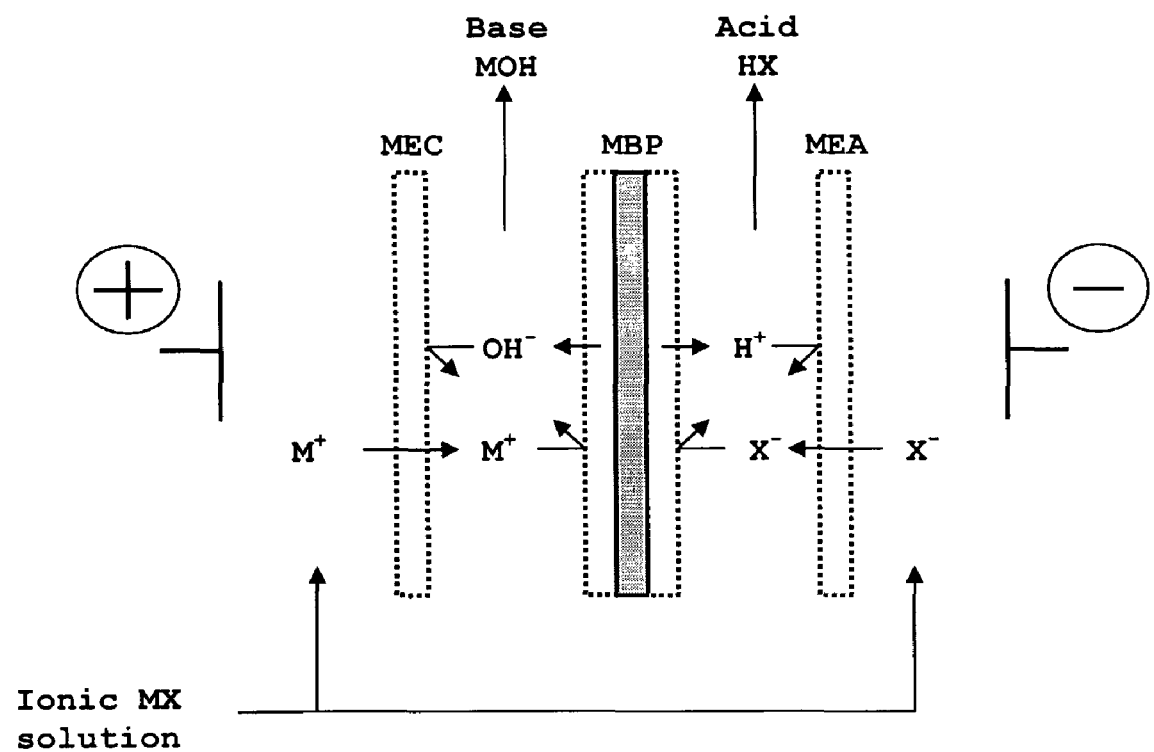
FIG. 6 illustrates an electrodialysis cell producing acid and base (MEC is cation exchange membrane or layer; MBP is bipolar membrane; MEA is anion exchange membrane or layer)

Preliminary works have shown that the bipolar membrane electroacidification (exemplified in FIGS. 5 and 6) of whey with bipolar membranes led to a partial precipitation of the fat portion of whey (about 30% of the initial fats). In order to improve this yield, tests were made using a whey protein concentrate (WPC) containing about 55% of proteins on dry basis, and were carried out for promoting interactions between whey proteins and lipids. These tests were also made to confirm the effect of a decrease in the ionic strength of WPC, either by demineralization using electrodialysis with monopolar membranes, or by dilution with water. Each final product was centrifuged, and the protein and lipid contents of the supernatants were measured in order to determine the precipitation rates of fat and proteins.

Materials and Methods

A fresh whey protein concentrate (WPC) was obtained from Agropur (Québec, Canada) and stored at 4° C. until experimentation. The composition of WPC is described in Table 3.

TABLE 3

Composition of whey protein concentrate.

|  | Humid Base | Dry Base |
|---|---|---|
| Dry Matter (%) | 15.0 ± 0.1 |  |
| Proteins (%) (N*6, 38) | 9.27 ± 0.02 | 61.8 |
| Lipids (%) | 0.75 ± 0.01 | 5.0 |
| Ashes (%) | 0.69 ± 0.01 | 4.6 |
| PH | 6.18 ± 0.05 |  |
| Conductivity (mS/cm) | 4.41 ± 0.05 |  |

Methods

Figure 7:
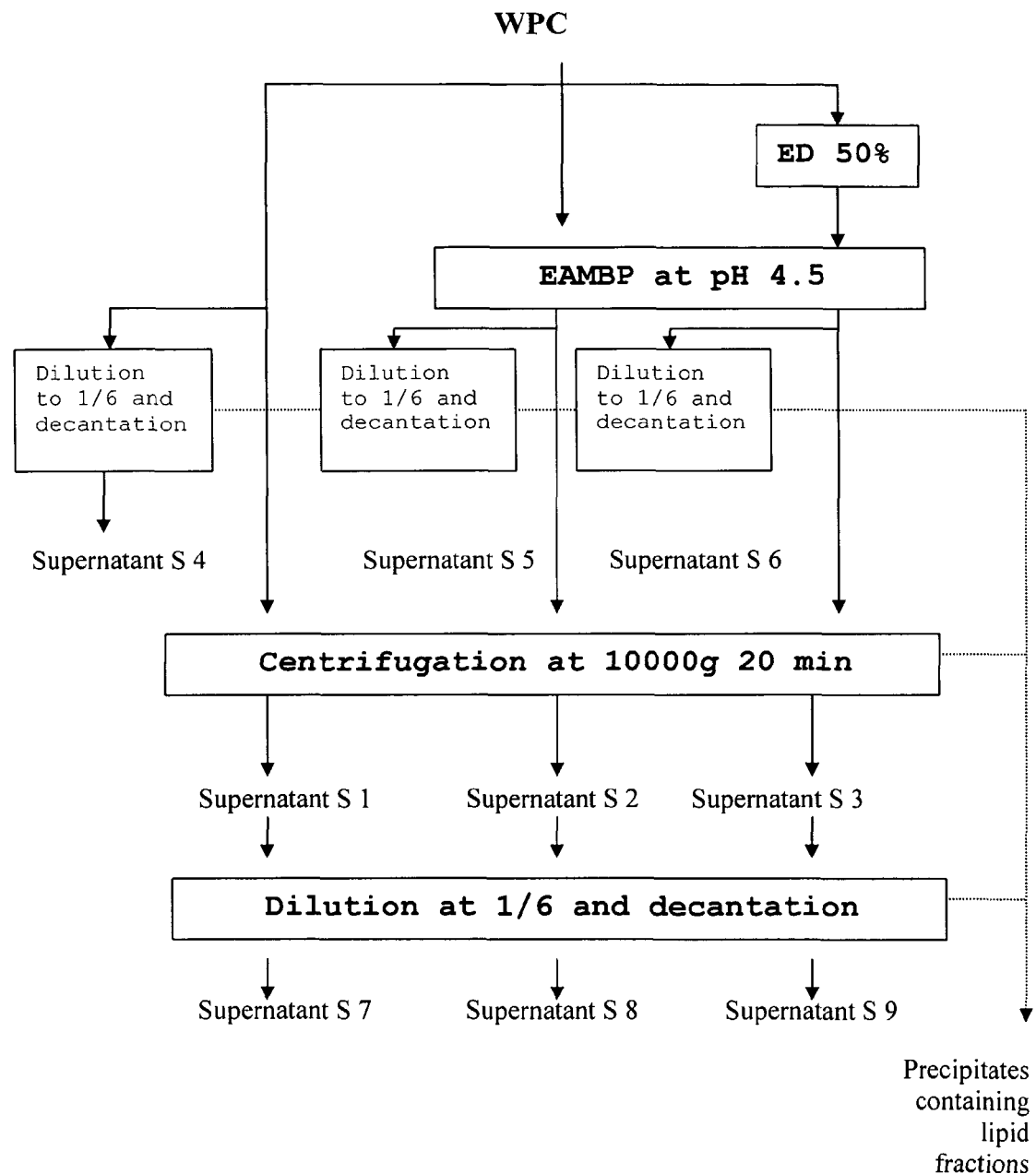
FIG. 7 is a schematic representation of the protocol used for the delipidation of whey protein concentrates.

Delipidation of WPC was established following the protocol illustrated in FIG. 7 and Table 4.

Centrifugation was performed at 10,000×g for 20 minutes. Electroacidification of WPC was performed at pH 4.5 while 50% demineralization was performed by ED, using monopolar membranes. Dilutions were performed by diluting 1 mL of sample into 5 mL of deionized water. Diluted samples were placed overnight at 4° C. and were centrifuged at 1,000×g for 5 minutes to ensure a proper separation between the supernatant and the pellets.

TABLE 4

Profile treatment of different fractions.

| Sample | A | B | C | D |
|---|---|---|---|---|
| S1 |  |  | + |  |
| S2 |  | + | + |  |
| S3 | + | + | + |  |
| S4 |  |  |  | + |
| S5 |  | + |  | + |
| S6 | + | + |  | + |
| S7 |  |  | + | + |
| S8 |  | + | + | + |
| S9 | + | + | + | + |

A 50% demineralization by ED
B Electroacidification, pH 4.5
C Centrifugation, 10,000 X g, 20 minutes
D Dilution 1/6 and decantation The lipid content was determined by NMR minispec MQ20 Bruker (Billerica, Mass., USA). while total nitrogen was determined by Leco FP-528 (Leco corp, St Joseph, Mich., USA). The precipitation of lipids in samples was determined by spectrophotometry at 500 nm.

Results

Electroacidification of WPC at pH 4.5 produced a significant decrease of the lipid content in the supernatant while the nitrogen content remained almost unchanged (Tables 5 and 6). The decrease of the lipid content in the supernatant is illustrated by its precipitation rates of 35±3% and 39±3% for samples S2 et S3, respectively, as compared to the S1 control sample which presented a precipitation rate of 18±1%. In addition, the lipid content decreased from 45% to 73% for the electroacidified samples as compared to 21-28% for the control samples, while the turbidity of the samples decreased by 80% following electroacidification. Those results are confirming that lipids are effectively precipitated during the BMEA process.

TABLE 5

Composition of sample S1, S2 and S3.

|  | S1 | S2 | S3 |
|---|---|---|---|
| Composition: | | | |
| Dry Matter (%) | 15.5 ± 0.2 | 16.1 ± 0.1 | 15.2 ± 0.90 |
| Proteins (%) (N*6, 38) | 9.1 ± 0.2 | 9.5 ± 0.2 | 9.2 ± 0.5 |
| Lipids (%) | 0.63 ± 0.003 | 0.54 ± 0.003 | 0.49 ± 0.01 |
| PH | 6.18 | 4.50 | 4.50 |
| Conductivity (mS/cm) | 4.4 ± 0.05 | 2.9 ± 0.1 | 1.3 ± 0.3 |
| Decrease in conductivity (%) | 0% | 34% | 70% |
| Precipitation rates: | | | |
| Proteins (%) | 4 ± 2% | 6 ± 2% | 6 ± 2% |
| Lipids (%) | 18 ± 1% | 35 ± 3% | 39 ± 3% |

TABLE 6

Composition of samples S4 to S9.

|  | S4 | S5 | S6 | S7 | S8 | S9 |
|---|---|---|---|---|---|---|
| Initial proteins (%) | 9.27 | 9.72 | 8.89 | 9.01 | 9.63 | 8.84 |
| Supernatant proteins (%) | 9.25 | 9.57 | 8.04 | 9.00 | 8.80 | 8.17 |
| Protein decrease (%) | 0% | 2% | 10% | 0% | 9% | 8% |
| Initial lipids (%) | 0.76 | 0.78 | 0.72 | 0.63 | 0.55 | 0.47 |
| Supernatant lipids (%) | 0.54 | 0.21 | 0.24 | 0.50 | 0.47 | 0.26 |
| Lipids decrease (%) | 28% | 73% | 66% | 21% | 49% | 45% |
| Supernatant turbidity (500 nm) | 0.93 | 0.14 | 0.11 | 0.62 | 0.18 | 0.14 |
| Turbidity decrease (%) | 0% | 85% | 88% | 33% | 81% | 85% |
| Initial conductivity (mS/cm) | 4.42 | 2.91 | 1.43 | 4.18 | 2.88 | 1.49 |
| Final conductivity (mS/cm) | 1.15 | 0.84 | 0.44 | 1.12 | 0.84 | 0.43 |
| Conductivity decrease (%) | 74% | 71% | 69% | 73% | 71% | 71% |

EXAMPLE III

Tofu Delipidation by Bipolar Membrane Electroalkalinization

Materials and Methods
Tofu Whey

Fresh soy tofu whey (STW) was obtained from a commercial tofu manufacturing plant (Unisoya, Saint-Isidore, QC, Canada) that employs magnesium chloride as the protein coagulant. The tofu whey composition was as follow: 0.50% of proteins, 0.44% of fat matter, 0.438% of ashes, and 96.42% of water. The pH was about 5.3-5.6. The phytoserum was skimmed by centrifugation (12 000 rpm, Westfalia separator, Los Angeles, Calif.). The liquid was then microfiltered (microfilter tetra pack) on a 1.2 micrometer pore size filter and passed through a reverse osmosis module. The composition of the defatted and concentrated (2×) phytoserum was: 1.25% of proteins and 0.72% of fat. The pH was 5.0.

EDBM Cell

Figure 8:
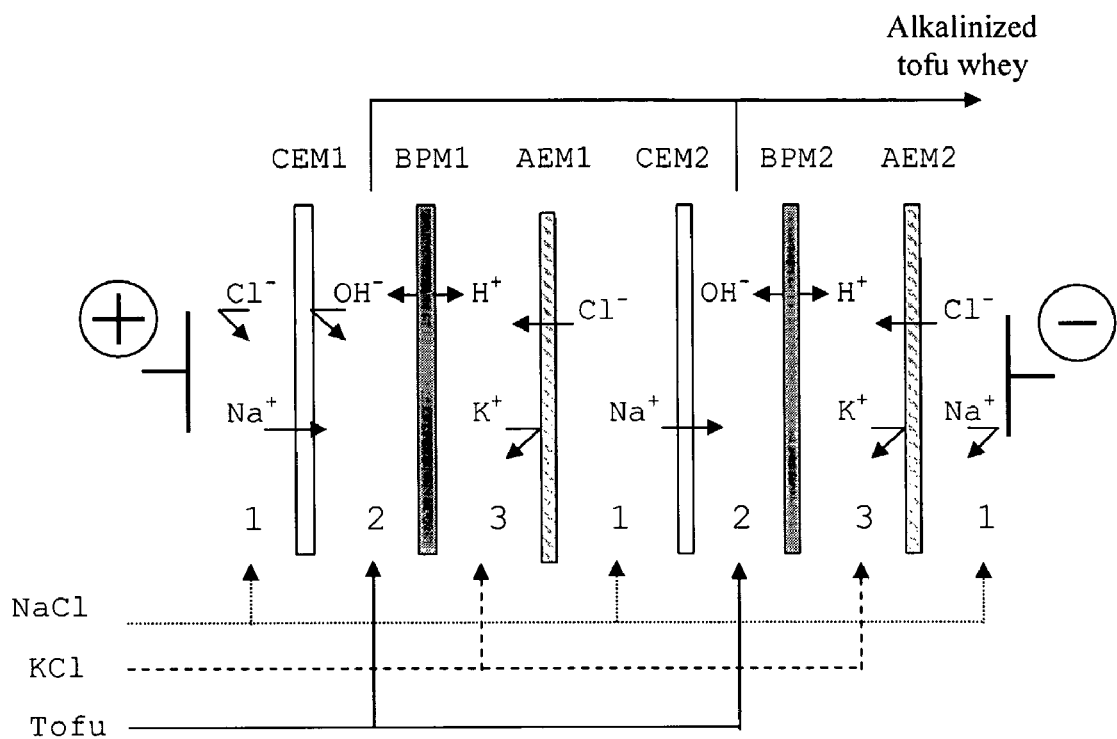
FIG. 8 illustrates a configuration of bipolar membrane electrodialysis cell for tofu whey alkalinization (BPM: bipolar membrane, AEM: anion-exchange membrane and CEM: cation-exchange membrane)

The module used was an MP type cell (100 cm$^2$ of effective electrode surface) from the company ElectroCell Systems AB (Täby, Sweden). The cell consists of a structure of seven compartment separated by four cationic membranes (Neosepta CMX C-0243, Tokuyama Soda Co. Ltd., Japan) and two Neosepta BP-1 bipolar membranes (Tokuyama Soda Co. Ltd.). This arrangement defines three circuits containing the tofu whey (2.0 L), a 2 g/L aqueous KCl solution (6 L) and a 20 g/L NaCl solution (6 L). Each circuit was connected to a separate external ten-litre reservoir, allowing for continuous recirculation (FIG. 8).

The anode/cathode voltage difference was supplied by a variable 0-100 V power source (Powerstat Model 236BU-2, The Superior Electric Co., Bristol, Colo.). The electrolytes were circulated using three centrifuge pumps and the flow rate was controlled at 2 L/min for the phytoserum and KCl solutions and at 3 L/min for the electrode rinsing solution. The anode of the module was a dimensionally stable anode (DSA), and the cathode was made of stainless steel 316.

EDBM was performed in batch process using a constant voltage of 20 Volts. 50-mL samples of the tofu whey were collected at the beginning of the treatment and thereafter every 1 pH unit increase all along the treatment, and at the end of the process.

Figure 9:
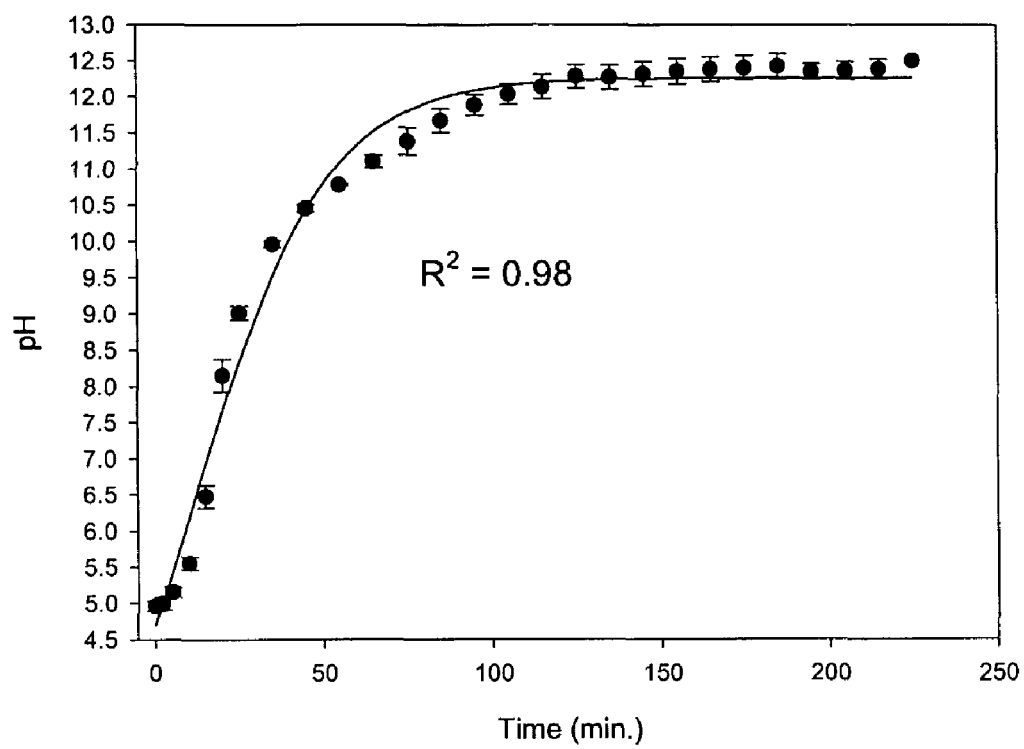
FIG. 9 illustrates the evolution of the pH of tofu whey solution during electroalkalinization.

Results pH Evolution and Treatment Duration:

During EDBM processing, the pH of STW increased from 5.17 to 12.6 in 230 min (FIG. 9). The pH increase during electroalkalinization of tofu whey followed a sigmoidal form as confirmed by the regression calculated ($R^2$=0.98): The increase in pH was quite linear during the first fifty minutes of the treatment and thereafter increased in a more slow fashion to reach a plateau at pH 12.5 after 150 min. of treatment.

Percentage of Fat Matter

Figure 10:
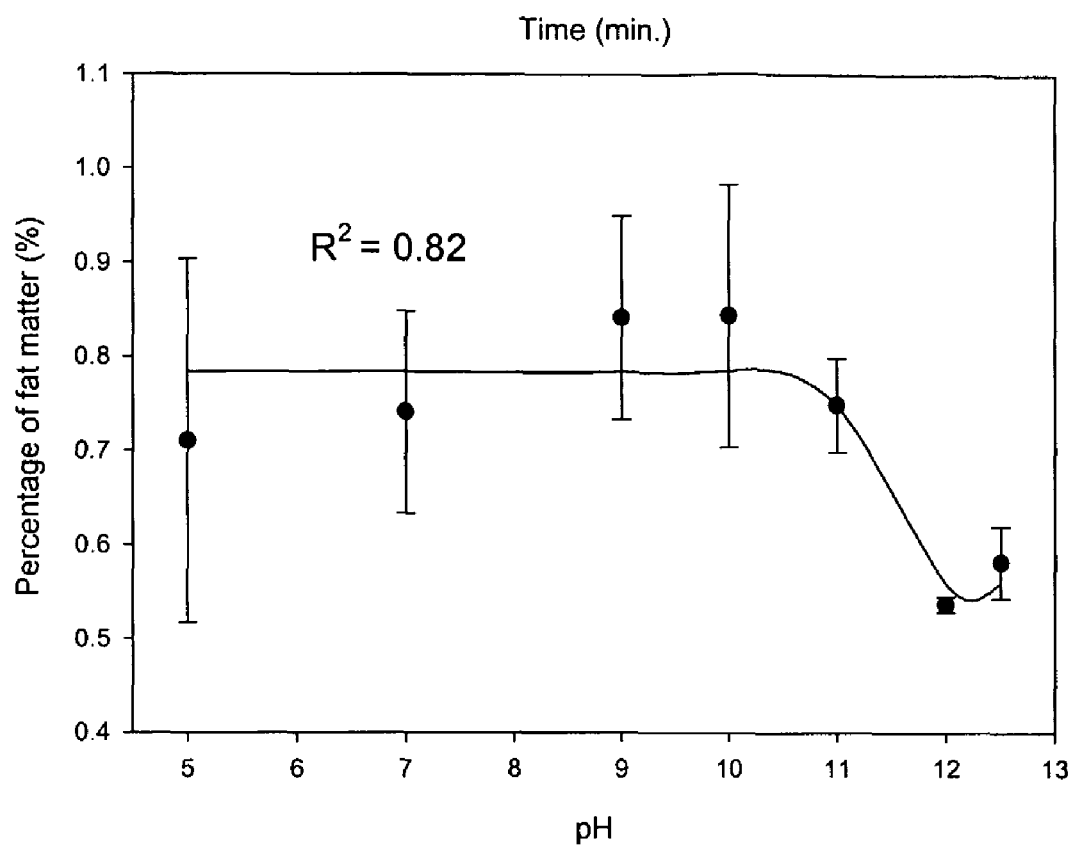
FIG. 10 illustrates an evolution of the fat matter percentage during electroalkalinization of tofu whey.

The percentage of fat matter was constant at 0.75% during the alkalinization of the tofu whey from initial pH to pH 11 (FIG. 10). After pH 11 was reached, the fat content in the tofu whey drastically decreased. At pH 12, the percentage of fat matter decreased to approximately 0.5% and was stay at this low value thereafter. The decrease in fat content represented a 37.5% decrease.

Percentage of Soluble Protein

Figure 11:
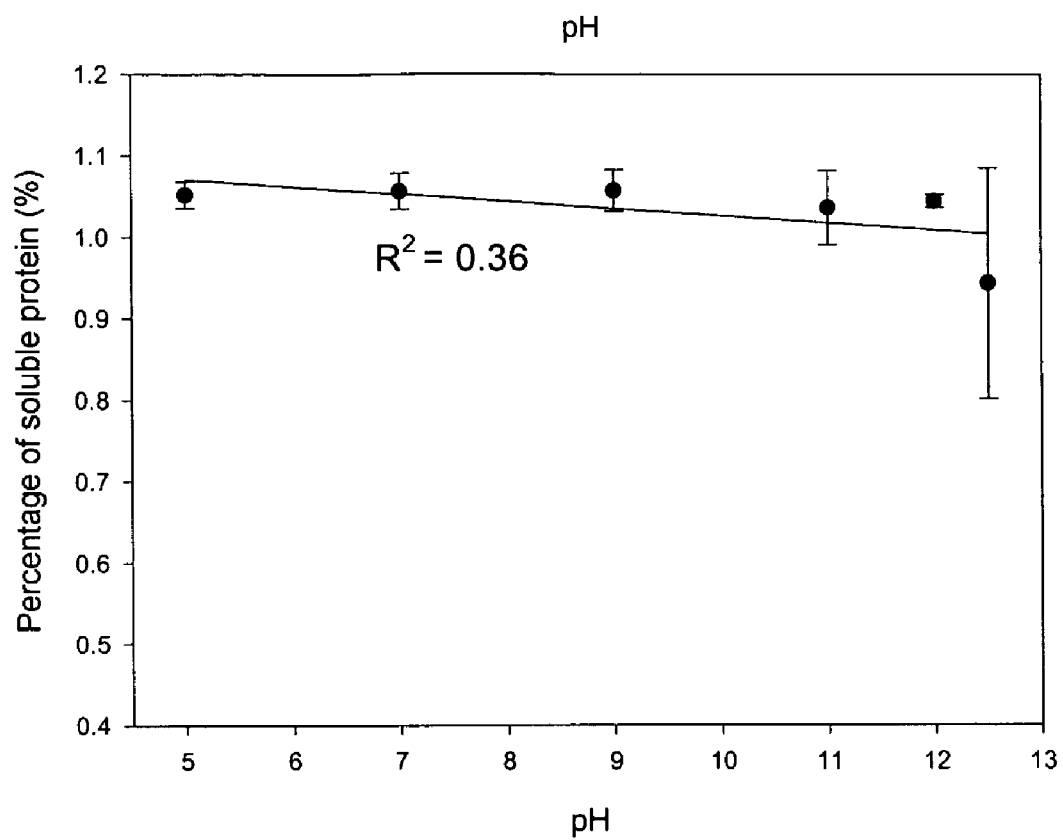
FIG. 11 illustrates an evolution of the soluble protein percentage during electroalkalinization of tofu whey.

The percentage of soluble was constant at 1.05% all along the treatment and that whatever the pH of the tofu whey (FIG. 11).

Conclusion

From these results it appeared that bipolar membrane alkalinization was a simple and environmental technology to increase the pH of the tofu solution and to allow the delipidation of the soy tofu whey.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

We claim:

1. A method for precipitating lipids from an animal-derived or vegetable-derived fatty solution to obtain a protein-enriched soluble fraction and a lipid-enriched precipitate comprising the steps of:
   a) subjecting the animal-derived or vegetable-derived fatty solution to treatment with at least one bipolar membrane to obtain a first precipitate comprising a lipid-enriched fraction and a first supernatant comprising a soluble protein-enriched fraction;
   b) adding deionized water to said first supernatant comprising the soluble protein-enriched fraction to obtain a supernatant with decreased ioninc strength; and
   c) separating from the supernatant with decreased ioninc strength a second precipitate comprising a lipid-enriched fraction thereby obtaining a protein-enriched soluble fraction and a lipid-enriched precipitate.

2. The method of claim 1, wherein said animal-derived or vegetable-derived fatty solution is a dairy-derived by-product selected from the group of cheese, yogurt, cream, milk, whey or a whey protein concentrate.

3. The method of claim 1, wherein said animal-derived or vegetable-derived fatty solution is milk whey, vegetable whey, vegetable juice, fruit juice, or wine.

* * * * *